United States Patent
Park et al.

(10) Patent No.: US 7,858,136 B2
(45) Date of Patent: Dec. 28, 2010

(54) METHOD FOR MANUFACTURING PURE OXYGEN—CONTAINING DILUTED SOJU

(75) Inventors: Yong-Nam Park, Seoul (KR);
Seong-Heum Kim, Daejeon (KR);
Hong-Seok Han, Daejeon (KR);
Seok-Gyu Yun, Daejeon (KR);
Yong-Woo Lee, Daejeon (KR); Yun-Mi Im, Daejeon (KR)

(73) Assignee: Sun Yang Co., Ltd. (KR)

( * ) Notice: Subject to any disclaimer, the term of this patent is extended or adjusted under 35 U.S.C. 154(b) by 1196 days.

(21) Appl. No.: 11/489,203

(22) Filed: Jul. 19, 2006

(65) Prior Publication Data
US 2007/0026103 A1 Feb. 1, 2007

(30) Foreign Application Priority Data
Jul. 27, 2005 (KR) .................... 10-2005-0068361

(51) Int. Cl.
*C12C 11/00* (2006.01)
(52) U.S. Cl. ................. 426/474; 426/11; 426/477
(58) Field of Classification Search ............... 426/11, 426/474, 477
See application file for complete search history.

(56) References Cited

U.S. PATENT DOCUMENTS 3,812,272 A * 5/1974 Linville .................... 426/592
5,329,963 A * 7/1994 Jones et al. .................. 141/6

FOREIGN PATENT DOCUMENTS

| EP | 0645168 | * | 3/1995 |
| KR | 1020020059982 | | 7/2002 |
| KR | 1020030038173 | | 5/2003 |
| RU | 2154101 | * | 8/2000 |

* cited by examiner

*Primary Examiner*—Anthony Weier
(74) *Attorney, Agent, or Firm*—Cantor Colburn LLP

(57) ABSTRACT

The present invention relates to pure oxygen-containing soju and a manufacturing method thereof. The invention provides the pure oxygen-containing diluted soju, which has excellent economy and shows a greatly reduced degree of a hangover after drinking thereof, because the amount of lost oxygen is minimized by injecting the largest possible amount of oxygen while preventing the release of oxygen using a method of injecting oxygen, and the amount of dissolved oxygen in the soju is maximized by injecting fine oxygen bubbles at low temperature, as well as a manufacturing method thereof.

6 Claims, 5 Drawing Sheets

METHOD FOR MANUFACTURING PURE OXYGEN—CONTAINING DILUTED SOJU

BACKGROUND OF THE INVENTION

1. Field of the Invention

The present invention relates to a method for manufacturing diluted soju (Korean liquor) containing pure oxygen.

2. Background of the Related Art

Most modern people frequently have a drinking party in their daily life and experience hangovers such as a headache and vomiting during or after alcoholic drinking.

Generally, alcoholic drinking causes oxygen in the body to become insufficient, because, when alcohol is decomposed in the body, three molecules of oxygen are required for completely decomposing one molecule of alcohol into carbonic acid gas and water.

Accordingly, alcoholic drinking naturally leads to a decrease in the amount of oxygen in the body, resulting in a low-oxygen state. For this reason, oxygen needs to be supplied in an amount larger than usual, and if oxygen is not sufficiently supplied, hangovers such as a headache and vomiting will occur.

Thus, there has been an effort to solve this problem by supplying oxygen through alcoholic drinks.

Korean Patent Publication No. 2003-0038173, entitled "oxygen soju", discloses functional soju manufactured to have an increased amount of dissolved oxygen by injecting oxygen generated using a PSA process, into soju at high pressure, and dissolving the injected oxygen.

However, in a case like said invention, in which oxygen generated using PSA is simply injected and dissolved in soju, there is a problem in that, because the released and lost amount of oxygen is larger than the injected amount, the amount of dissolved oxygen is very small, so that the dissolved oxygen has low effect and is inefficient.

Also, Korean Patent Publication 2002-0059982 (entitled "apparatus for manufacturing alcoholic drink containing oxygen") discloses an apparatus for manufacturing oxygen-containing alcoholic drink, comprising a supply line for supplying a given manufactured liquor, a heat exchanger placed on the supply line and including a cooler that performs a cooling process in a given space, and a mixing and storage tank which receives the liquor cooled by the exchange and to which an oxygen generator is connected.

However, when liquor is manufactured using a manufacturing apparatus such as said invention, there are problems in that the amount of oxygen dissolved in the liquor is very small, and most of oxygen is lost or released during bottling and packing procedures.

Accordingly, there is a need for additional studies to inject oxygen into soju without loss and to maximize the amount of dissolved oxygen in soju, such that the soju does not cause a low-oxygen state resulting from alcoholic drinking and shows a reduced degree of a hangover.

SUMMARY OF THE INVENTION

Accordingly, the present invention has been made to solve the above problems occurring in the prior art, and an object of the present invention is to provide pure oxygen-containing diluted soju, which has excellent economy and shows a greatly reduced degree of a hangover after drinking thereof, because the lost amount of oxygen in the soju is minimized by injecting the largest possible amount of oxygen while preventing the release of oxygen using a method of injecting oxygen three times, and the amount of dissolved oxygen in the soju is maximized by injecting fine oxygen bubbles at a low-temperature state, as well as a manufacturing method thereof.

Another object of the present invention is to provide pure oxygen-containing diluted soju, which has a mild and smooth taste, because the unique unfavorable odor of the soju is removed together with some of dissolved oxygen, which flows out of the soju after injection.

The present invention relates to a method for manufacturing pure oxygen-containing diluted soju.

The inventive method for manufacturing pure oxygen-containing diluted soju comprises the steps of: (1) preparing 95% ethyl alcohol; (2) diluting the ethyl alcohol with brewing water to an alcohol concentration of 40-60% to make a first dilution; (3) aging the first dilution at room temperature for 7-10 days; (4) diluting the aged dilution with brewing water to an alcohol concentration of 20-36% to make a second dilution; (5) passing the second dilution through nine columns packed with activated carbon at a space velocity (SV) of 3-5 $h^{-1}$ so as to deodorize and purify the dilution; (6) filtering the purified dilution through a filter, thus preparing diluted soju; (7) transferring the diluted soju of step (6) to a storage tank and then subjecting the diluted soju to a first pure oxygen injection process, in which the diluted soju is aerated with pure oxygen (99.8-99% purity) bubbles using an air stone placed in the storage tank; (8) transferring the diluted soju of step (7) to a cooler, in which it is cooled to 15-20° C., and then subjecting the cooled soju is subjected to a second pure oxygen injection process, in which pure oxygen bubbles are sprayed into the cooled soju using an air stone; (9) transferring the diluted soju of step (8) to a bottling unit, in which it is bottled; (10) subjecting the bottled soju to a third pure oxygen injection process, in which pure oxygen is sprayed directly into the uncapped bottle containing the diluted soju; and (11) transferring the bottled soju of step (10) to a capping unit, in which the bottle containing the diluted soju is sealed with a cap, thus manufacturing diluted soju having a dissolved oxygen content of 20-28 ppm and a final alcohol concentration of 19-35%.

In another embodiment, the inventive method for manufacturing diluted soju containing pure oxygen comprises: (1) preparing 95% ethyl alcohol; (2) diluting the ethyl alcohol with brewing water to an alcohol concentration of 40-60% to make a first dilution; (3) aging the first dilution at room temperature for 7-10 days; (4) diluting the aged dilution with brewing water to an alcohol concentration of 20-36% to make a second dilution; (5) passing the second dilution through nine columns packed with activated carbon at a space velocity (SV) of 3-5 $h^{-1}$ so as to deodorize and purify the dilution; (6) treating the purified dilution with far-infrared rays by passing it through one column packed with a far infrared-emitting carrier and silver particles at a space velocity of 25; (7) adding, to the far-infrared-treated dilution of step (6), a syrup prepared from at least six food additives selected from additives provided in the Liquor Tax Law, in an amount of 0.01-2 vol % based on the total volume of the dilution; (8) filtering the mixture solution of step (7) through a filter, thus preparing diluted soju; (9) transferring the diluted soju of step (8) to a storage tank of a first oxygen supply unit and subjecting the transferred diluted soju to a first pure oxygen injection process, in which pure oxygen (99.8-99.99% purity) bubbles are aerated into the diluted soju at an flow rate of 2-8 l/min for 3-20 minutes using an airstone placed in the storage tank; (10) transferring the diluted soju of step (9) to a second oxygen supply unit, in which the diluted soju is cooled 15-20° C. using a cooler, and then subjected to a second pure oxygen injection process, in which pure oxygen bubbles having a diameter of 0.1-1 μm are sprayed into the diluted soju at a flow rate of 2-8 l/min using the air stone; (11) transferring the diluted soju of step (10) to a bottling unit, in which it is bottled; (12) subjecting the bottled diluted soju to a third pure oxygen injection process, in which pure oxygen is sprayed directly into the uncapped bottle containing the diluted soju;

and (13) transferring the bottled soju of step (10) to a capping unit, in which the bottle containing the diluted soju is sealed with a cap.

Regarding the food additives added in the seventh step, at least six food additives selected from additives provided in the Liquor Tax Law, including sugar, citric acid, sucralose, sorbitol, acesulfame K, erythritol, xylitol and teas (excluding processed grain tea among single teas (soaking type) are mixed with each other in an amount of 0.001-0.5% (W/V) for each additive based on the volume of the dilution so as to prepare a syrup, which is then added in an amount of 0.01-2 vol % based on the total volume of the dilution.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Alcoholic drinking causes three molecules of oxygen per one molecule of alcohol to be consumed for the decomposition of alcohol in the body. Accordingly, alcoholic drinking naturally leads to a decrease in the amount of oxygen in the body, resulting in a low-oxygen state.

Thus, the present inventors have conducted many studies to solve the problem of hangovers such as headache and vomiting occurring after alcoholic drinking due to insufficient oxygen supply caused by a low-oxygen state resulting from a reduction in the amount of oxygen in the body and, as a result, have completed the present invention after undergoing many trials and errors.

Meanwhile, the present invention can employ either soju manufactured according to Korean Patent Registration No. 10-0400822 (entitled "method for manufacturing soju") owned by the applicant, or general soju.

When soju is manufactured such that a sufficient amount of oxygen is contained in the above-described prior soju, the manufactured soju can cause reduced intoxication compared to the same amount of the prior soju, can be rapidly decomposed in the body and can cause a reduced degree of hangover.

However, there are problems in that, when soju is injected with oxygen, the amount of released oxygen becomes larger than the amount of injected oxygen, and most of oxygen is released or lost between a bottling step and a capping step.

To solve these problems, the present inventors have used a method of injecting pure oxygen into soju three times using a first oxygen supply unit, a second oxygen supply unit and a third oxygen supply unit, to maximize the efficiency thereof.

Figure 1:
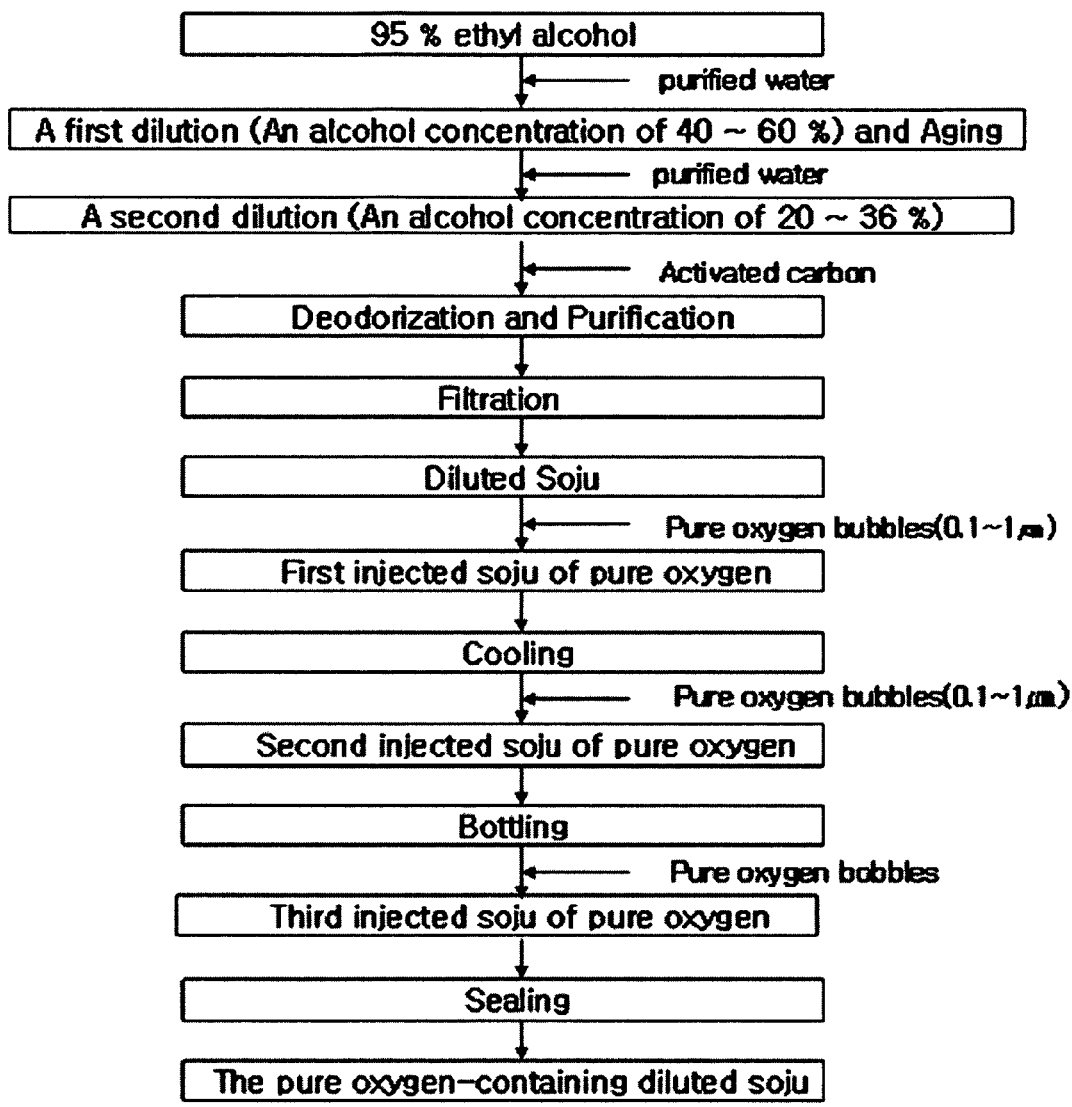
FIG. 1 is a flow diagram showing a process for manufacturing pure oxygen-containing diluted soju according to one embodiment of the present invention.
Figure 2:
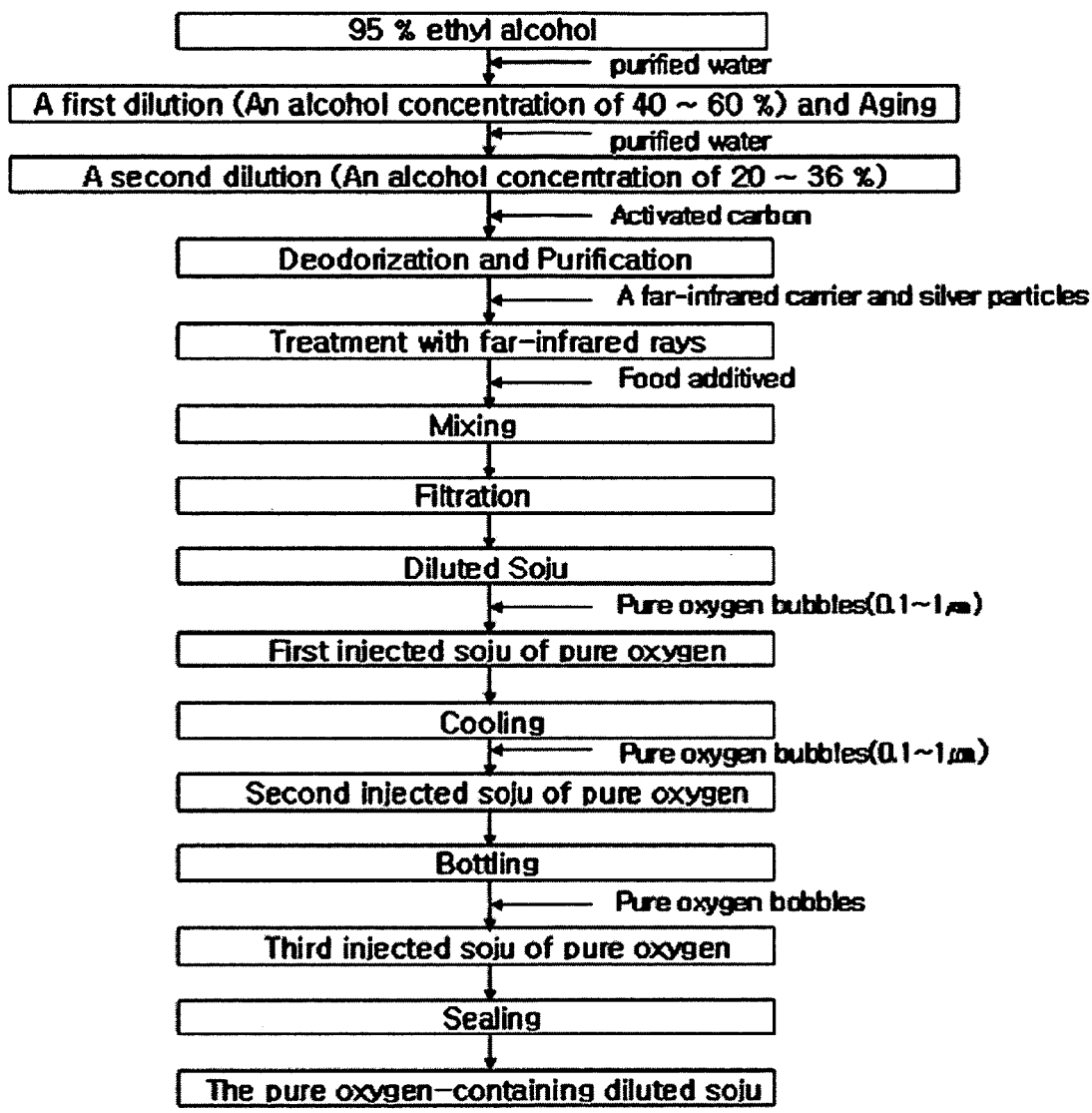
FIG. 2 is a flow diagram showing a process for manufacturing pure oxygen-containing diluted soju according to another embodiment of the present invention.
Figure 3:
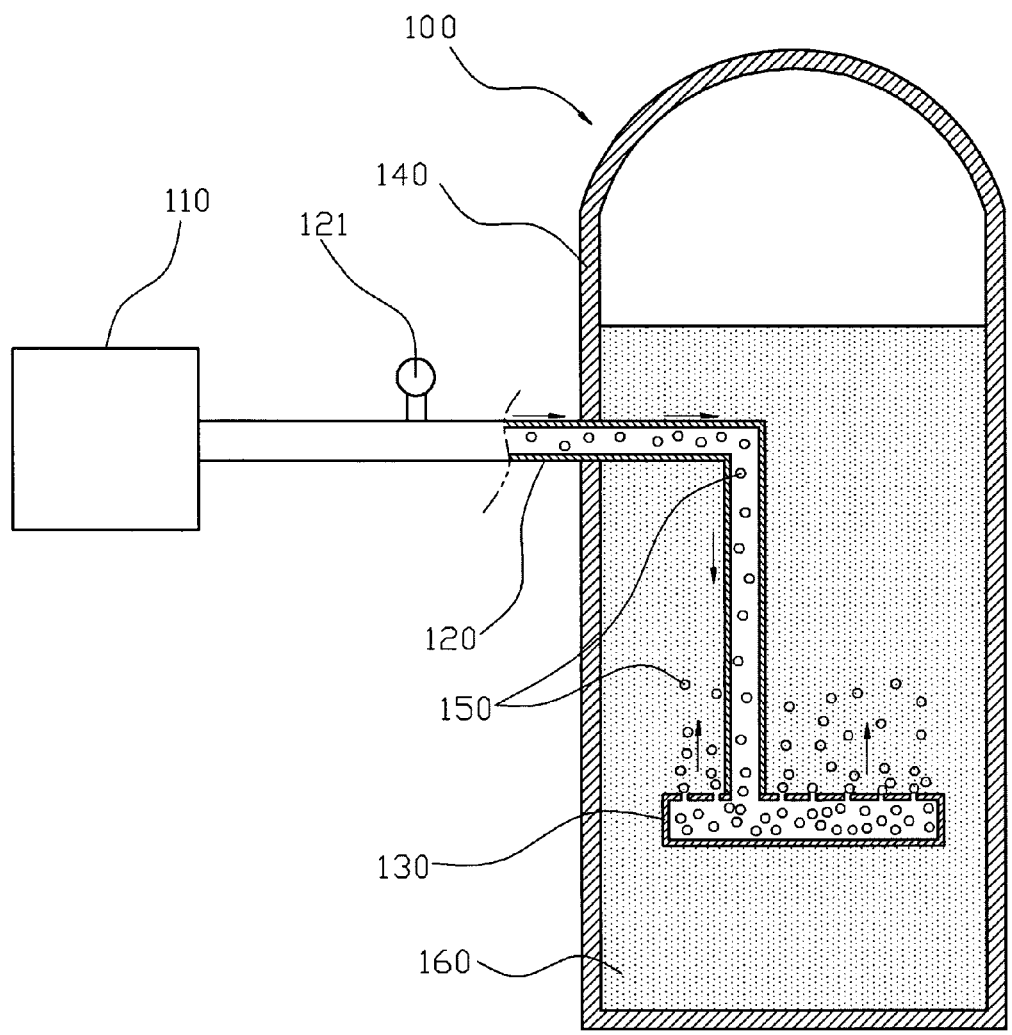
FIG. 3 is a cross-sectional view of a first oxygen supply unit according to the present invention.

FIG. 3 shows the structure of the first oxygen supply unit 100 according to the present invention. As shown in FIG. 3, the first oxygen supply unit 100 comprises: a storage tank 140 for receiving and storing diluted soju 160; a pure oxygen supply pipe for supplying pure oxygen generated from an oxygen generator 110; a pressure gauge 121 disposed at the pure oxygen supply pipe 120 so as to control the supply pressure of oxygen; and an air stone 130 placed in the storage tank so as to be connected with the pure oxygen supply pipe and serving to aerate soju with pure oxygen bubbles 150.

Using the first oxygen supply unit 100 having the above-described structure, the diluted soju is a first pure oxygen injection process.

In other words, ethyl alcohol is diluted to prepare diluted soju 160 which is then transferred to the storage tank 140 of the first oxygen supply unit 100. In the first oxygen supply unit, pure oxygen (99.8-99.99% purity) generated from the oxygen generator 110 is supplied through the pure oxygen supply pipe 120 into the air stone 130 placed in the storage tank 140, and the diluted soju is subjected to the first pure oxygen injection step, in which the pure oxygen bubbles 150 are sprayed through the air stone nozzle.

When a general nozzle is used to inject oxygen, there are problems in that the time required for saturation of oxygen is long and the amount of dissolved amount is rapidly reduced. For this reason, it has been found in the present invention that, when the pure oxygen bubbles 150 are aerated and injected at a flow rate of 2-8 l/min for 3-20 minutes using an air stone controlled to provide spray pure oxygen having a bubble diameter of 0.1-1 μm, the time required for saturation is shortened while the amount of dissolved oxygen is increased.

Figure 4:
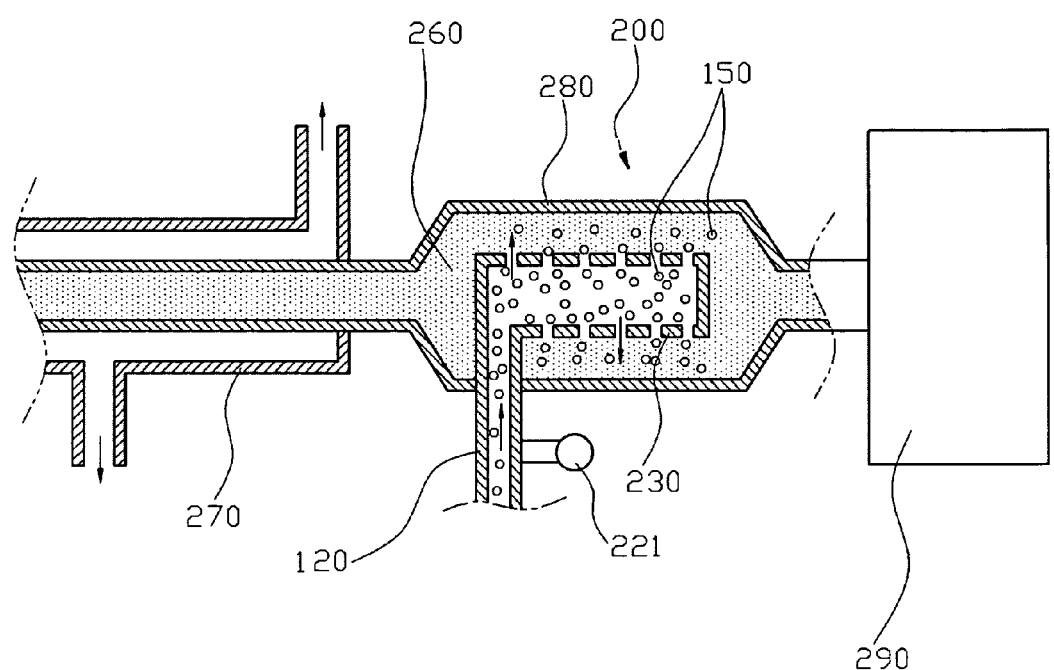
FIG. 4 is a cross-sectional view of a second oxygen supply unit according to the present invention.

After the first pure oxygen injection process, but before bottling the diluted soju, the diluted soju is subjected to a second pure oxygen injection process using a second oxygen supply unit. FIG. 4 shows the structure of a second oxygen supply unit 200 which is used in the present invention. As shown in FIG. 4, the second oxygen supply unit 200 comprises: a soju transfer pipe 280 for transferring the diluted soju 260 subjected to the first pure oxygen injection process; a cooler 270 for cooling the diluted soju subjected to the first pure oxygen injection process; a pure oxygen supply pipe 120 for supplying pure oxygen generated from the oxygen generator 110; a pressure gauge 121 placed at the pure oxygen supply pipe 120 so as to control the supply pressure of oxygen; and an air stone 230 placed in the soju transfer pipe 280 so as to be connected with the pure supply pipe 120 and serving to spray pure oxygen bubble 150.

The diluted soju which has been subjected to the first pure oxygen injection process has a temperature of more than 25° C. If the diluted soju having this temperature is subjected to the second pure oxygen injection process, there is a problem in that the content of dissolved oxygen in the diluted soju is decreased.

To increase the content of dissolved oxygen, the temperature of the diluted soju subjected to the first pure oxygen injection process should be controlled to 15-20° C. For this purpose, according to the present invention, the diluted soju subjected to the first pure oxygen injection process is passed through the cooler 200 having attached thereto a refrigerant below −15° C. so as to lower the temperature of the soju to 15-20° C., and then is subjected to the second pure oxygen injection process, in which the oxygen bubbles 150 are sprayed into the soju at a flow rate of 2-8 l/minute using the air stone 230 controlled to correspond to a oxygen bubble diameter 0.1-1 μm.

Figure 5:
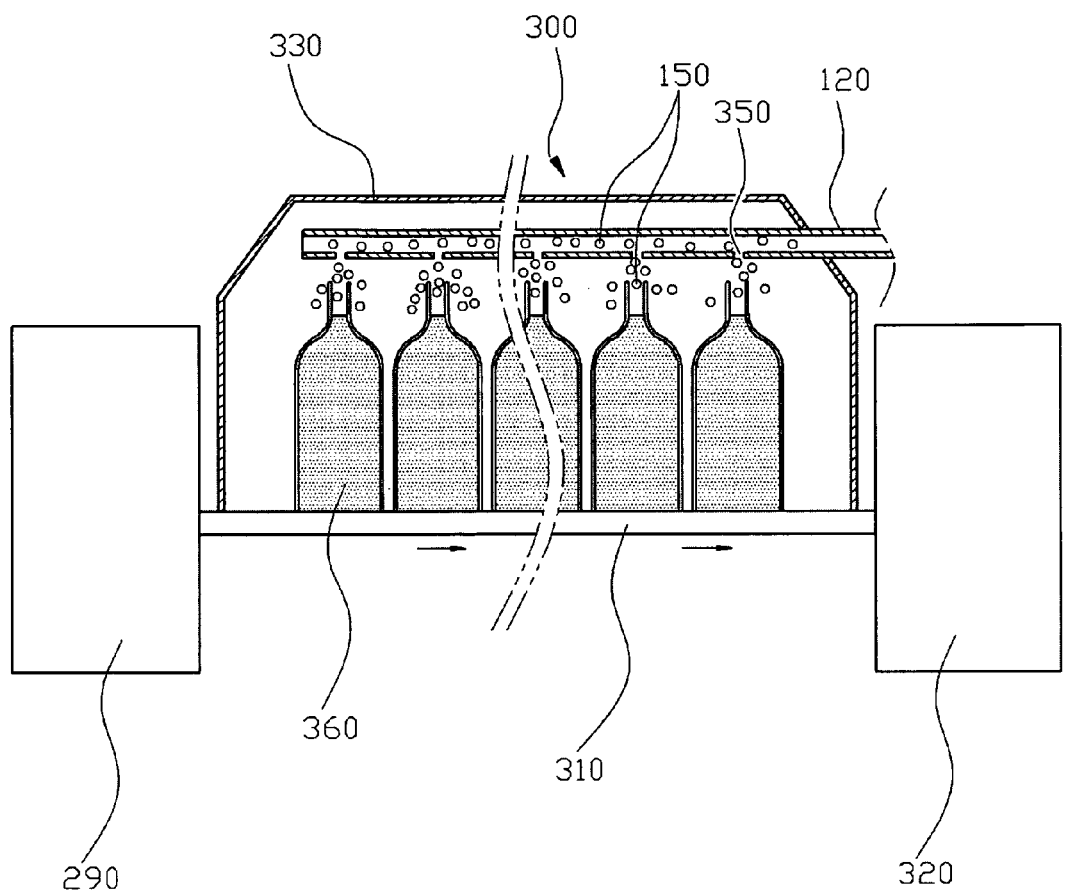
FIG. 5 is a cross-sectional view of a third oxygen supply unit according to the present invention.

The diluted soju which has been subjected to the second pure oxygen injection process is further subjected to a third pure oxygen injection process using a third oxygen supply unit, after being bottled, but just before being transferred to a capping unit. FIG. 5 shows the structure of a third oxygen supply unit 300 according to the present invention.

As shown in FIG. 5, the third oxygen supply unit 300 comprises: an air curtain 330 for preventing the diluted soju from coming in contact with external air; a pure oxygen supply pipe 120 for supplying pure oxygen generated from the oxygen generator 110; and an air nozzle 350.

The diluted soju 360 subjected to the second pure oxygen injection process, is transferred to a bottling unit 290, in which it is bottled. Oxygen contained in the bottled soju can be partially lost before capping the bottle. For this reason, before capping the bottle, pure oxygen is once more injected into the soju in the bottle by spraying pure oxygen using the third oxygen supply unit 300.

In other words, during the process in which the soju subjected to the second pure oxygen injection solution 360 is transferred from the bottling unit 290 to the capping unit, it is passed through the air curtain 300 including the pure oxygen supply pipe 120. In the air curtain 300, pure oxygen is sprayed through the air nozzle 250 directly into the soju contained in the bottle (third pure oxygen injection process). Then, the bottle is capped. This third pure oxygen injection process can maximize the amount of dissolved oxygen in the soju.

The inventive soju thus manufactured is pure oxygen-containing diluted soju which has a dissolved oxygen content of 20-28 ppm and a final alcohol concentration of 19-35%.

Hereinafter, the method for manufacturing the inventive pure oxygen-containing diluted soju will be described in detail.

Method for Manufacturing Pure Oxygen-Containing Diluted Soju According to One Embodiment of the Present Invention Step 1: Preparation of Ethyl Alcohol 95% ethyl alcohol is prepared.

Step 2: Preparation of First Dilution

The ethyl alcohol prepared in step 1 is diluted with purified water suitable for use as brewing water to make a first dilution having an alcohol concentration of 40-60%.

Step 3: Aging

The first dilution of step 2 is aged at room temperature for 7-10 days.

Step 4: Preparation of Second Dilution

The dilution aged in step 3 is further diluted with brewing water to make a second dilution having an alcohol concentration of 20-36%.

Step 5: Deodorization and Purification

The second dilution of step 4 is deodorized and purified by passing it through nine columns packed with activated carbon at a space velocity of 3-5 $h^{-1}$.

Step 6: Filtration

The purified dilution of step 5 is filtered through a filter, thus preparing diluted soju.

Step 7: First-Step Injection of Pure Oxygen

The diluted soju 160 of step 6 is transferred to the storage tank 140.

In the storage tank 140, the diluted soju 160 is subjected to a first pure oxygen injection process, in which pure oxygen (99.8-99.99% purity) produced using the oxygen generator 110 is into the diluted soju 160 through the pure oxygen supply pipe 120 using the air stone 130 placed in the storage tank 140.

Step 8: Second-Step Injection of Pure Oxygen

The diluted soju 260 from step 7 is transferred to the cooler 270, in which it is cooled to 15-20° C. Then, pure oxygen bubbles 150 are injected into the cooled soju 260 using the air stone 130 placed in the cooler (second pure oxygen injection process).

Step 9: Bottling

The diluted soju 360 subjected to the second pure oxygen injection process is transferred to the bottling unit 290, in which it is bottled.

Step 10: Third-Step Injection of Pure Oxygen

After bottling the diluted soju in step 9, but just before transferring it to a capping unit, the bottled soju is passed through the air curtain 330, in which pure oxygen is sprayed directly into the diluted soju contained in the bottle (third pure oxygen injection process).

Step 11: Sealing

The bottle containing the diluted soju subjected to the third pure oxygen injection process is transferred to a capping unit 320, in which it is sealed with a cap. In this way, the pure oxygen-containing diluted soju according to the present invention is manufactured.

Method for Manufacturing Pure Oxygen-Containing Diluted Soju According to Another Embodiment of the Present Invention Step 1: Preparation of Ethyl Alcohol 95% ethyl alcohol is prepared.

Step 2: Preparation of First Dilution

The ethyl alcohol prepared in step 1 is diluted with purified water suitable for use as brewing water to make a first dilution having an alcohol concentration of 40-60%.

Step 3: Aging

The first dilution of step 2 is aged at room temperature for 7-10 days.

Step 4: Preparation of Second Dilution

The dilution aged in step 3 is further diluted with brewing water to make a second dilution having an alcohol concentration of 20-36%.

Step 5: Deodorization and Purification

The second dilution of step 4 is deodorized and purified by passing it through nine columns packed with activated carbon at a space velocity of 3-5 $h^{-1}$.

Step 6: Treatment with Far-Infrared Rays

The purified dilution of Step 5 is treated with far-infrared rays by passing it through one column packed with a far-infrared carrier and silver particles at a space velocity of 25.

As the far-infrared carrier, an inorganic material obtained by sintering at least one selected from the group consisting of alumina, silica, clay, feldspar, iron oxide, manganese oxide, copper oxide, cobalt oxide and magnesia at 1,300° C. for 10 hours is used. Also, the silver particles used have a purity of 99.99% and a particle size of 1-5 mm.

When the soju is treated with far-infrared rays by passing it through the column packed with the far-infrared carrier and silver particles as described above, the alcoholic odor of the soju is reduced and the taste of the soju becomes mild and smooth.

Step 7: Addition of Food Additives

To the far-infrared-treated dilution of step 6, a syrup prepared from at least 6 food additives selected from additives provided in the Liquor Tax Law is added in an amount of 0.01-2 vol % based on the total volume of the dilution.

In this step, at least six food additives selected from additives provided in the Liquor Tax Law, including sugar, citric acid, sucralose, sorbitol, acesulfame K, erythritol, xylitol and teas (excluding processed grain tea among single teas (soaking type) are mixed with each other in an amount of 0.001-0.5% (W/V) for each additive based on the volume of the dilution so as to prepare a syrup, which is then added in an amount of 0.01-2 vol % based on the total volume of the dilution.

Step 8: Filtration

The mixture of step 7 is filtered through a filter, yielding diluted soju.

Step 9: First-Step Injection of Pure Oxygen

The diluted soju 160 of step 8 is transferred to the storage tank 140 of the first oxygen supply unit 100.

In the storage tank 140, the diluted soju 160 is subjected to a first pure oxygen injection process, in which pure oxygen (99.8-99.99%) generated from the oxygen generator 110 is formed into the pure oxygen bubbles having a diameter of 0.1-1 μm through the nozzle of the air stone placed in the storage tank 140, and the formed oxygen bubbles are aerated into the diluted soju through the pure oxygen supply pipe 120 at a flow rate of 2-8 l/min for 3-20 minutes.

Step 10: Second-Step Injection of Pure Oxygen

The diluted soju 260 subjected to the first pure oxygen injection process is transferred to the second oxygen supply unit 200.

In the second oxygen supply unit 200, the diluted soju 260 is cooled to 15-20° C. using the cooler 270, and then subjected to a second pure oxygen injection process, in which the pure oxygen bubbles 150 having a diameter of 0.1-1 μm are sprayed into the diluted soju at a flow rate of 2-8 l/min using the air stone 230 placed in the soju transfer pipe 280.

Step 11: Bottling

The diluted soju 360 subjected to the second pure oxygen injection process is transferred to the bottling unit 290, in which it is bottled.

Step 12: Third-Step Injection of Pure Oxygen

After bottling the diluted soju in step 9, but just before transferring it to a capping unit, the bottled soju is passed through the air curtain 330, in which pure oxygen is sprayed directly into the diluted soju contained in the bottle (third pure oxygen injection process).

Step 11: Sealing

The bottle containing the diluted soju subjected to the third pure oxygen injection process is transferred to a capping unit 320, in which it is sealed with a cap. In this way, the pure oxygen-containing diluted soju according to the present invention is manufactured.

The inventive pure oxygen-containing diluted soju manufactured according to the above-described method has a dissolved oxygen content of 20-28 ppm and a final alcohol concentration of 19-35%.

Hereinafter, the present invention will be described in further detail with reference to Examples and Test Examples. It is to be understood, however, that these examples are illustrative purposes only and are not to be construed to limit the scope of the present invention.

Example 1

Preparation 1 of Pure Oxygen-Containing Diluted Soju

95% ethyl alcohol was prepared.

1000 l of the ethyl alcohol was diluted with 1,375 l of brewing water to an alcohol concentration of 40% to make a first dilution, and the first dilution was aged at room temperature for 10 days.

2,375 l of the aged dilution was diluted with 1,425 l of brewing water to an alcohol concentration of 36% to make a second dilution.

The second dilution was deodorized and purified by passing it through nine columns packed with activated carbon at a space velocity of 3 $h^{-1}$, and then filtered through a filter, thus preparing diluted soju. The diluted soju was transferred to the storage tank 140.

In the storage tank 140, the diluted soju was subjected to a first pure oxygen injection process, in which 0.1-μm-size pure oxygen (99.99% purity) bubbles 150 produced using the oxygen generator 110 were aerated into the diluted soju 160 at a flow rate of 8 l/min for 3 minutes using the nozzle of the air stone 130 placed in the storage tank 140.

The diluted soju 260 subjected to the first pure oxygen injection process was transferred to the cooler 270, in which it was cooled to 15° C. Then, the cooled soju was subjected to a second pure oxygen injection process, in which pure oxygen bubbles 150 were sprayed into the diluted soju at a flow rate of 2 l/min using the air stone 230 placed in the cooler. Then, the diluted soju was transferred to the bottling unit 290, in which it was bottled.

After bottling, the bottled soju was passed through the air curtain 330 using a conveyor 310, during which it was subjected to a third pure oxygen injection process, in which pure oxygen was injected directly into the bottle.

The bottled soju subjected to the third pure oxygen injection process was transferred to the capping unit 320, in which it was sealed with a cap. This yielded the inventive pure oxygen-containing diluted soju having a dissolved oxygen content of 20 ppm and an alcohol concentration of 30%.

Example 2

Preparation 2 of Pure Oxygen-Containing Diluted Soju

95% ethyl alcohol was prepared.

1000 l of the ethyl alcohol was diluted with 900 l of brewing water to an alcohol concentration of 50% to make a first dilution, and the first dilution was aged at room temperature for 10 days.

1,000 l of the aged dilution was diluted with 1,267 l of brewing water to an alcohol concentration of 20% to make a second dilution.

The second dilution was deodorized and purified by passing it through nine columns packed with activated carbon at a space velocity of 3.5 $h^{-1}$, and then filtered through a filter, thus preparing diluted soju. The diluted soju was transferred to the storage tank 140.

In the storage tank 140, the diluted soju was subjected to a first pure oxygen injection process, in which 0.2-μm-size pure oxygen (99.89% purity) bubbles 150 produced using the oxygen generator 110 were aerated into the diluted soju 160 at a flow rate of 5 l/min for 10 minutes using the nozzle of the air stone 130 placed in the storage tank 140.

The diluted soju 260 subjected to the first pure oxygen injection process was transferred to the cooler 270, in which it was cooled to 25° C. Then, the cooled soju was subjected to a second pure oxygen injection process, in which pure oxygen bubbles 150 having a size of 0.2 μm were sprayed into the diluted soju at a flow rate of 3 l/min using the air stone 230 placed in the cooler 270. Then, the diluted soju was transferred to the bottling unit 290, in which it was bottled.

After bottling the soju, but just before transferring it to the capping unit 320, the diluted soju was transferred to the third oxygen supply unit 300.

The diluted soju was passed through the air curtain 330 by the conveyor 310, while it was subjected to a third pure oxygen injection process, in which pure oxygen was sprayed into the uncapped bottle containing the diluted soju using the air nozzle 350.

The bottled soju subjected to the third pure oxygen injection process was transferred to the capping unit 320, in which it was sealed with a cap. This yielded the inventive pure oxygen-containing diluted soju having a dissolved oxygen content of 23 ppm and an alcohol concentration of 19%.

Example 3

Preparation 3 of Pure Oxygen-Containing Diluted Soju

95% ethyl alcohol was prepared.

1000 l of the ethyl alcohol was diluted with 900 l of brewing water to an alcohol concentration of 50% to make a first dilution, and the first dilution was aged at room temperature for 10 days.

1,900 l of the aged dilution was diluted with 1,900 l of brewing water to an alcohol concentration of 25% to make a second dilution.

The second dilution was deodorized and purified by passing it through nine columns packed with activated carbon at a space velocity of 3.5 h$^{-1}$.

Meanwhile, alumina, silica, clay, feldspar, iron oxide, manganese oxide, copper oxide and cobalt oxide were mixed with each other in the same amount, and the mixture was calcined at 1300° C. for 10 hours, thus preparing a far-infrared carrier.

The above purified dilution was treated with far-infrared rays by passing it through one column packed with said far-infrared carrier and silver particles having a particle size of 3 mm at a space velocity of 25.

Meanwhile, 0.02% (W/V) citric acid, 0.1% (W/V) high fructose, 0.005% (W/V) xylitol, 0.01% (W/V) sorbitol, 0.001% (W/V) glycine and 0.005% (W/V) salt were mixed with each other to prepare a syrup. Then, the syrup was added and mixed with said dilution treated with far-infrared rays.

The mixture solution was then filtered through a filter, thus preparing diluted soju.

The diluted soju was transferred to the storage tank 140.

In the storage tank 140, the diluted soju was subjected to a first pure oxygen injection process, in which 0.5-μm-size pure oxygen (99.80% purity) bubbles 150 produced using the oxygen generator 110 were aerated into the diluted soju 160 at a flow rate of 3 l/min for 15 minutes using the nozzle of the air stone 130 placed in the storage tank 140.

The diluted soju 260 subjected to the first pure oxygen injection process was transferred to the second oxygen supply unit 200.

In the second oxygen supply unit 200, the diluted soju 260 was cooled to 15° C. using the cooler 270, and then subjected to a second pure oxygen injection process, in which pure oxygen bubbles 150 having a size of 0.5 μm were sprayed into the diluted soju at a flow rate of 5 l/min using the air stone 230 placed in the cooler 270. Then, the diluted soju was transferred to the bottling unit 290, in which it was bottled.

After bottling the soju, but just before transferring it to the capping unit 320, the diluted soju was transferred to the third oxygen supply unit 300.

The diluted soju was passed through the air curtain 330 by the conveyor 310, while it was subjected to a third pure oxygen injection process, in which pure oxygen was sprayed into the uncapped bottle containing the diluted soju using the air nozzle 350.

The bottled soju subjected to the third pure oxygen injection process was transferred to the capping unit 320, in which it was sealed with a cap. This yielded the inventive pure oxygen-containing diluted soju having a dissolved oxygen content of 27 ppm and an alcohol concentration of 20.5%.

Example 4

Preparation 4 of Pure Oxygen-Containing Diluted Soju

95% ethyl alcohol was prepared.

1000 l of the ethyl alcohol was diluted with 583 l of brewing water to an alcohol concentration of 60% to make a first dilution, and the first dilution was aged at room temperature for 10 days. oxygen (99.80% purity) bubbles 150 produced using the oxygen generator 110 were aerated into the diluted soju 160 at a flow rate of 2 l/min for 20 minutes using the nozzle of the air stone 130 placed in the storage tank 140.

The diluted soju 260 subjected to the first pure oxygen injection process was transferred to the second oxygen supply unit 200.

In the second oxygen supply unit 200, the diluted soju 260 was cooled to 25° C. using the cooler 270, and then subjected to a second pure oxygen injection process, in which pure oxygen bubbles 150 having a size of 1 μm were sprayed into the diluted soju at a flow rate of 8 l/min using the air stone 230 placed in the cooler 270. Then, the diluted soju was transferred to the bottling unit 290, in which it was bottled.

After bottling the soju, but just before transferring it to the capping unit 320, the diluted soju was transferred to the third oxygen supply unit 300.

The diluted soju was passed through the air curtain 330 by the conveyor 310, while it was subjected to a third pure oxygen injection process, in which pure oxygen was sprayed into the uncapped bottle containing the diluted soju using the air nozzle 350.

The bottled soju subjected to the third pure oxygen injection process was transferred to the capping unit 320, in which 1,583 l of the aged dilution was diluted with 1,584 l of brewing water to an alcohol concentration of 30% to make a second dilution.

The second dilution was deodorized and purified by passing it through nine columns packed with activated carbon at a space velocity of 5 h$^{-1}$.

Meanwhile, alumina, silica, clay, feldspar, iron oxide, manganese oxide, copper oxide and cobalt oxide were mixed with each other in the same amount, and the mixture was calcined at 1300° C. for 10 hours, thus preparing a far-infrared carrier.

The above purified dilution was treated with far-infrared rays by passing it through one column packed with said far-infrared carrier and silver particles having a particle size of 1 mm at a space velocity of 25 h$^{-1}$.

0.001% (W/V) acesulfame K, 0.01% (W/V) citric acid, 0.01% (W/V) sucralose, 0.02% (W/V) sorbitol, 0.005% (W/V) xylitol and 0.1% (W/V) high fructose were mixed with each other each other to prepare a syrup. Then, the syrup was added to and mixed with said dilution treated with far-infrared rays.

The mixture solution was then filtered through a filter, thus preparing diluted soju.

The diluted soju was transferred to the storage tank 140.

In the storage tank 140, the diluted soju was subjected to a first pure oxygen injection process, in which 1-μm-size pure it was sealed with a cap. This yielded the inventive pure oxygen-containing diluted soju having a dissolved oxygen content of 20 ppm and an alcohol concentration of 25%.

TEST EXAMPLE 1

Sensory Evaluation on Unfavorable Odor of Alcohol in Cases of Injection or Non-Injection of Pure Oxygen Sensory evaluation was performed to examine the removal of unfavorable odor of alcohol resulting from the injection of pure oxygen.

95% ethyl alcohol was diluted with purified water to an alcohol concentration of 20.5%.

To the alcohol dilution, acetaldehyde that influences the unfavorable odor of alcohol was added at a concentration of 200 ppm.

Samples were divided into a test group and a control group, in which the test group was injected with pure oxygen (99.99% purity) at a flow rate of 2 l/min for 5 minutes, and the control group was not injected with pure oxygen.

The sensory evaluation was performed using 10 selected persons (five men and five women) by carrying out a sensory test for an initial sample and then immediately causing the panels to get clear air for at least 30 seconds before the next sensory test.

During the test, the samples were stored in a state where the bottles containing the samples were not capped for the volatilization of initially injected aldehyde. The test results are shown in Table 1 below.

TABLE 1

Measurement of unfavorable odor of alcohol according to injection or non-injection of pure oxygen

| | 1 min | 2 min | 3 min | 4 min | 5 min | 6 min | 7 min | 8 min | 9 min | 10 min |
|---|---|---|---|---|---|---|---|---|---|---|
| Control group (not injected with pure oxygen) | 10 persons | 10 persons | 10 persons | 7 persons | 5 persons | 3 persons | 1 person | 1 person | 0 | 0 |
| Test group (injected with pure oxygen) | 10 persons | 5 persons | 2 persons | 1 person | 1 person | 0 | 0 | 0 | 0 | 0 |

As can be seen in Table 1, in the case of the control group not injected with pure oxygen, 50% of the sensory panels felt the unfavorable odor of alcohol up to 5 minutes after the initiation of the test, and there was a person who felt unfavorable odor even after 8 minutes.

However, in the test group injected with pure oxygen, only 50% of the sensory panels felt the unfavorable odor of alcohol up to 2 minutes after the start of the test, and there was no person who felt the unfavorable odor after 6 minutes.

This suggests that aldehyde is volatilized due to pure oxygen, so that the odor of aldehyde is removed, leading to a faster removal of alcohol odor.

TEST EXAMPLE 2

Measurement of Dissolved Oxygen Content at Varying Oxygen Bubble Sizes and Temperatures Soju having an alcohol concentration of 20% was prepared.

A general nozzle corresponding to an oxygen bubble size of 2-5 mm, and an air stone nozzle corresponding to an oxygen bubble size of 0.1-1.0 μm, were prepared.

Oxygen was injected into the soju using the general nozzle and the air stone nozzle, and the amounts of dissolved oxygen at varying soju temperatures were measured. The measurement results are shown in Table 2 below.

TABLE 2

Measurement results for amounts (ppm) of dissolved oxygen at varying oxygen bubble sizes and temperatures

| | 35° C. | 30° C. | 25° C. | 20° C. | 15° C. | 10° C. | 5° C. | 0° C. |
|---|---|---|---|---|---|---|---|---|
| General nozzle | 19.1 | 19.3 | 19.4 | 19.4 | 19.6 | 19.8 | 19.8 | 20.0 |
| Air stone | 22.7 | 24.8 | 27.4 | 30.1 | 33.3 | 37.3 | 42.2 | 48.5 |

As can be seen in Table 2 above, in the case where pure oxygen was injected using the air stone nozzle used in the present invention, the amount of dissolved oxygen in the soju was significantly large due to the fine size of the oxygen bubbles, compared to the case where oxygen was injected using the general nozzle.

Also, it could be observed that, as the temperature of the soju was decreased, the amount of dissolved oxygen was increased.

TEST EXAMPLE 3

Measurement of Change in Dissolved Oxygen Content with Time After Saturation of Oxygen Soju having an alcohol concentration of 21% was prepared.

A general nozzle corresponding to an oxygen bubble size of 2-5 mm, and an air stone nozzle corresponding to an oxygen bubble size of 0.1-1.0 μm, were prepared.

The soju at 25° C. was saturated with pure oxygen using each of the nozzles until a change in the dissolved oxygen content of the soju did not occur. Then, a change in the dissolved oxygen content with time was measured, and the measurement results are shown in Table 3 below.

TABLE 3

Measurement results for change in dissolved oxygen content (ppm) with time after saturation of oxygen

|  | Just after injection | 5 min | 10 min | 20 min | 30 min | 1 hrs | 3 hrs | 5 hrs | 15 hrs | 24 hrs |
|---|---|---|---|---|---|---|---|---|---|---|
| General nozzle | 19.4 | 14 | 10.5 | 9.1 | 8.9 | 8.2 | 8.1 | 8.0 | 8.0 | 8.0 |
| Air stone | 27.4 | 26.5 | 25.5 | 24.3 | 22.5 | 22.3 | 21.5 | 21.1 | 20.5 | 18.0 |

As can be seen in Table 3 above, in the case of using the air stone nozzle that sprayed fine bubbles, the dissolved oxygen content was significantly high, and was not greatly decreased because oxygen remained dissolved in the soju due to fine bubble size.

TEST EXAMPLE 4

Sensory Evaluation on Pure Oxygen-Containing Soju According to the Present Invention Pure oxygen-containing diluted soju samples prepared according to Examples 1 to 4 of the present invention were prepared.

Commercially available soju was prepared.

Sensory evaluation was performed on a nine-point scale for the smoothness, alcoholic odor, taste and preference of the soju samples.

As sensory panels, 40 men and women (10 persons for each group of 10, 20, 30 and 40-year-old age groups.

The sensory evaluation was performed, and the evaluation results are shown in Table 4 below.

TABLE 4

Sensory evaluation results

|  | Softness | Alcoholic odor | Clear taste | Overall taste | Preference | Total |
|---|---|---|---|---|---|---|
| Example 1 | 8.8 | 8.6 | 8.7 | 8.8 | 8.8 | 8.74 |
| Example 2 | 8.8 | 8.7 | 8.8 | 8.8 | 8.8 | 8.78 |
| Example 3 | 8.9 | 8.8 | 8.9 | 8.9 | 8.9 | 8.88 |
| Example 4 | 8.6 | 8.9 | 8.9 | 8.9 | 8.8 | 8.82 |
| Commercial soju | 7.0 | 6.8 | 6.9 | 6.9 | 6.9 | 6.9 |

*Evaluation value (9: very good, 0: very bad).

As can be seen in Table 4 above, the inventive pure oxygen-containing diluted soju had a smooth taste, little or no alcoholic odor, a clear taste, a high overall taste and a high preference, compared to the commercial soju. Thus, it could be found that the inventive soju was excellent with respect to all of taste, flavor and preference, compared to general soju.

As described above, the present invention provides the diluted soju containing pure oxygen, which has excellent economy and shows a greatly reduced degree of a hangover after drinking thereof, because the lost amount of oxygen in the soju is minimized by injecting the largest possible amount of oxygen while preventing the release of oxygen using a method of injecting oxygen three times, and the amount of dissolved oxygen in the soju is maximized by injecting fine oxygen bubbles at a low-temperature state, as well as a manufacturing method thereof.

Also, the present invention provides the diluted soju containing pure oxygen, which has a mild and smooth taste, because the unique unfavorable odor of the soju is removed together with some of dissolved oxygen, which flows out of the soju after injection.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for manufacturing pure oxygen-containing diluted soju, comprising the steps of:
    (1) preparing 95% ethyl alcohol;
    (2) diluting the ethyl alcohol with brewing water to an alcohol concentration of 40-60% to make a first dilution;
    (3) aging the first dilution at room temperature for 7-10 days;
    (4) diluting the aged solution with brewing water to an alcohol concentration of 20-36% to make a second dilution;
    (5) passing the second dilution through nine columns packed with activated carbon at a space velocity (SV) of 3-5 $h^{-1}$ so as to deodorize and purify the dilution;
    (6) filtering the purified dilution through a filter, thus preparing diluted soju;
    (7) transferring the diluted soju of step (6) to a storage tank and then subjecting the diluted soju to a first pure oxygen injection process, in which the diluted soju is aerated with pure oxygen (99.8-99% purity) bubbles using an air stone placed in the storage tank;
    (8) transferring the diluted soju of step (6) to a cooler, in which it is cooled to 15-20° C., and then subjecting the cooled soju is subjected to a second pure oxygen injection process, in which pure oxygen bubbles are sprayed into the cooled soju using an air stone;
    (9) transferring the oxygen-injected soju of step (8) to a bottling unit, in which it is bottled;
    (10) subjecting the bottled soju to a third pure oxygen injection process, in which pure oxygen is sprayed directly into the uncapped bottle containing the diluted soju; and
    (11) transferring the bottled soju of step (10) to a capping unit, in which the bottle containing the diluted soju is sealed with a cap.

2. A method for manufacturing diluted soju containing pure oxygen comprises:
    (1) preparing 95% ethyl alcohol;
    (2) diluting the ethyl alcohol with brewing water to an alcohol concentration of 40-60% to make a first dilution;
    (3) aging the first dilution at room temperature for 7-10 days;

(4) diluting the aged dilution with brewing water to an alcohol concentration of 20-36% to make a second dilution;
(5) passing the second dilution through nine columns packed with activated carbon at a space velocity (SV) of 3-5 $h^{-1}$ so as to deodorize and purify the dilution;
(6) treating the purified dilution with far-infrared rays by passing it through one column packed with a far infrared-emitting carrier and silver particles at a space velocity of 25 $h^{-1}$;
(7) adding, to the far-infrared-treated dilution of step (6), a syrup prepared from at least six food additives selected from additives provided in the Liquor Tax Law, in an amount of 0.01-2 vol % based on the total volume of the dilution;
(8) filtering the mixture solution of step (7) through a filter, thus preparing diluted soju;
(9) transferring the diluted soju of step (8) to a storage tank of a first oxygen supply unit and subjecting the transferred diluted soju to a first pure oxygen injection process, in which pure oxygen (99.8-99.99% purity) bubbles are aerated into the diluted soju using an air stone placed in the storage tank;
(10) transferring the diluted soju of step (9) to a second oxygen supply unit, in which the diluted soju is cooled 15-20° C. using a cooler, and then subjected to a second pure oxygen injection process, in which pure oxygen bubbles are sprayed into the diluted soju using an air stone;
(11) transferring the diluted soju of step (10) to a bottling unit, in which it is bottled;
(12) subjecting the bottled diluted soju to a third pure oxygen injection process, in which pure oxygen is sprayed directly into the uncapped bottle containing the diluted soju; and
(13) transferring the bottled soju of step (10) to a capping unit, in which the bottle containing the diluted soju is sealed with a cap.

3. The method of claim 2, wherein the aeration in the first pure oxygen process is carried out at an oxygen flow rate of 2-8 l/min for 3-20, and the spraying in the second pure oxygen process is carried out at an oxygen flow rate of 2-8 l/min.

4. The method of claim 2, wherein the first oxygen supply unit in step (9) comprises: the storage tank for receiving and storing the diluted soju; a pure oxygen supply pipe for supplying pure oxygen generated from an oxygen generator; a pressure gauge disposed at the pure oxygen supply pipe to control the supply pressure of oxygen; and the air stone placed in the storage tank so as to be connected to the pure oxygen supply pipe and serving to aerate the diluted soju with the pure oxygen bubbles.

5. The method of claim 2, wherein the second oxygen supply unit in step (10) comprises: a soju transfer pipe for transferring the diluted soju subjected to the first pure oxygen injection process; the cooler for cooling the diluted soju subjected to the first pure oxygen injection process; a pure oxygen supply pipe for supplying pure oxygen generated from a oxygen generator; a pressure gauge 121 placed at the pure oxygen supply pipe so as to control the supply pressure of oxygen; and an air stone placed in the soju transfer pipe so as to be connected with the pure supply pipe 120 and serving to spray pure oxygen bubbles into the diluted soju.

6. The method of claim 2, wherein the third oxygen supply unit in step 12 comprises: an air curtain for preventing the diluted soju from coming in contact with external air; a pure oxygen supply pipe for supplying pure oxygen generated from an oxygen generator; and an air nozzle for spraying the pure oxygen.

\* \* \* \* \*